United States Patent [19]

Rumpf et al.

[11] Patent Number: 4,895,317
[45] Date of Patent: Jan. 23, 1990

[54] ELECTRICALLY ACTUATABLE LOCKING MECHANISM FOR A SEAT BELT RETRACTOR

[75] Inventors: Robert J. Rumpf, Grosse Pointe; Angel Fernandez, Mt. Clemens, both of Mich.

[73] Assignee: TRW Vehicle Safety Systems Inc., Lyndhurst, Ohio

[21] Appl. No.: 264,638

[22] Filed: Oct. 31, 1988

[51] Int. Cl.$^4$ ............... B60R 22/38; B60R 22/40
[52] U.S. Cl. ................... 242/107.4 R; 242/107.4 B
[58] Field of Search ............ 242/107.4 R, 107.4 A, 242/107.4 B; 280/806; 297/477, 478; 180/268-270; 188/137, 138, 161-163

[56] References Cited

U.S. PATENT DOCUMENTS

| | | | |
|---|---|---|---|
| 3,952,966 | 4/1976 | Burleigh | 242/107.4 R |
| 3,967,794 | 7/1976 | Fohl | 242/107.4 R |
| 4,008,864 | 2/1977 | Torphammar et al. | 242/107.4 R |
| 4,103,754 | 8/1978 | Ashworth et al. | 242/107.4 R X |
| 4,181,326 | 1/1980 | Hollowell et al. | 280/806 |
| 4,573,556 | 3/1986 | Andreasson | 188/137 |
| 4,729,525 | 3/1988 | Rumpf | 242/107.4 B |

OTHER PUBLICATIONS

Roters, *Electromagnetic Devices*, 1941, pp. 490-504.

Primary Examiner—John M. Jillions
Attorney, Agent, or Firm—Tarolli, Sundheim & Covell

[57] ABSTRACT

A seat belt retractor comprises a spindle having seat belt webbing wound thereon. The spindle is supported for rotation in belt withdrawal and belt retraction directions. A member is movable between a first position in which the spindle is free to rotate in the belt withdrawal direction and a second position in which the spindle is blocked from rotating in the belt withdrawal direction. A permanent magnet is fixed to the member. An energizable electromagnet includes a core located adjacent the permanent magnet for attracting the permanent magnet to thereby move the member to one of its first and second positions when the electromagnet is de-energized. The core repels the permanent magnet to thereby move the member to the other one of its first and second positions upon energization of said electromagnet.

13 Claims, 3 Drawing Sheets

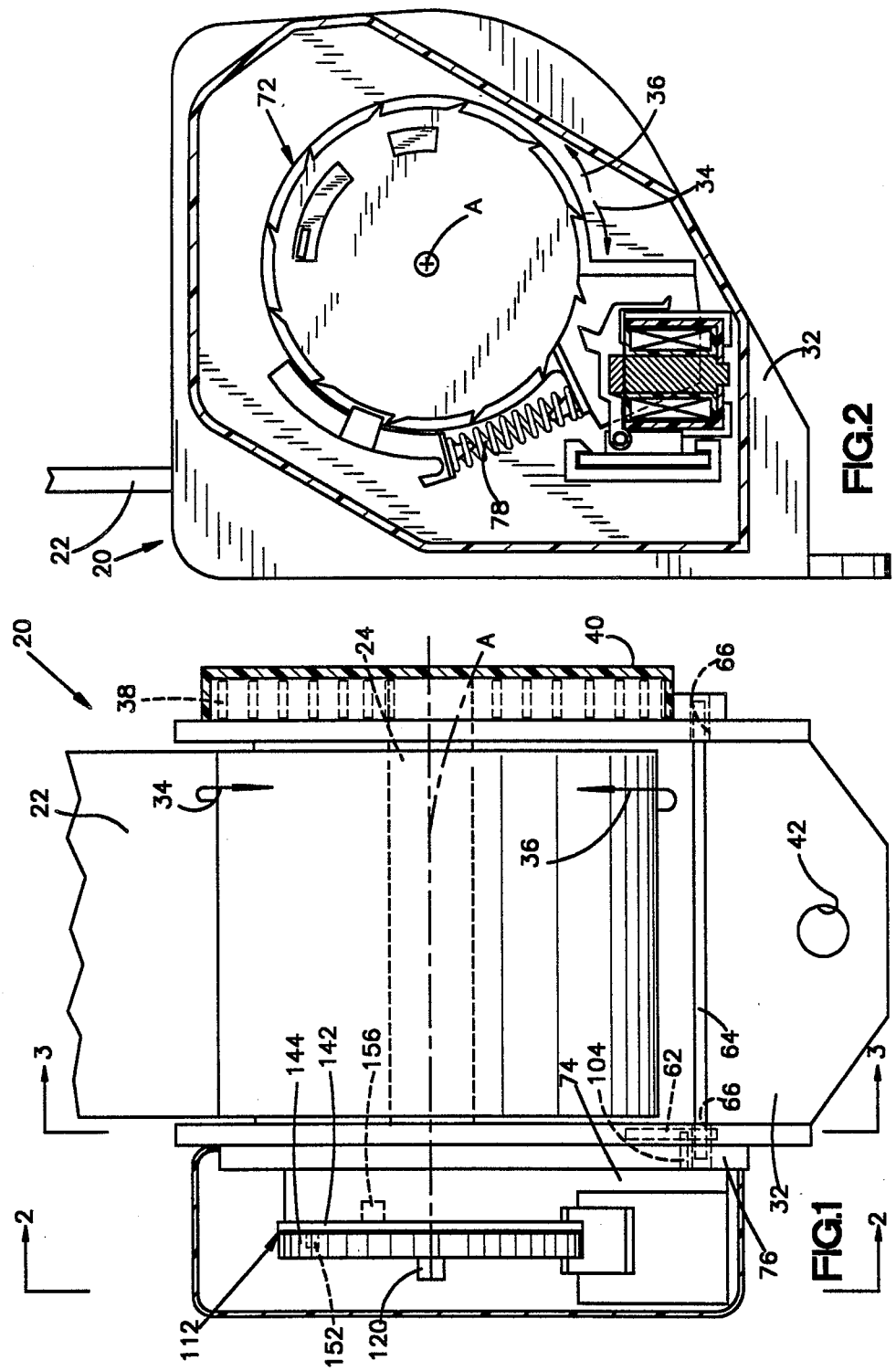

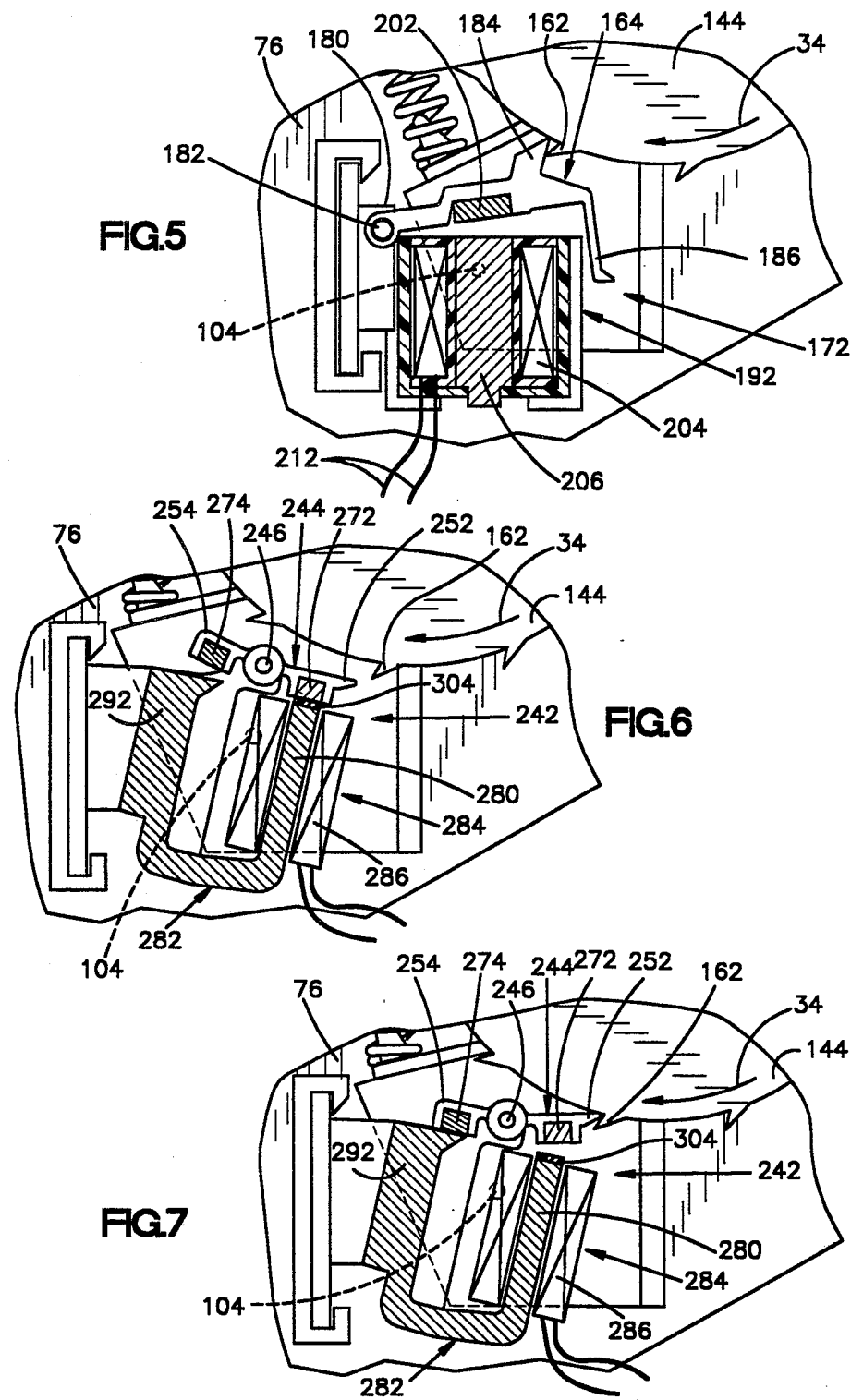

ELECTRICALLY ACTUATABLE LOCKING MECHANISM FOR A SEAT BELT RETRACTOR

BACKGROUND OF THE INVENTION

1. Technical Field

The present invention relates to a seat belt retractor and, in particular, relates to an electrically actuatable locking mechanism for locking a seat belt retractor to prevent withdrawal of seat belt webbing.

2. Description of the Prior Art

It is known that during a vehicle collision, a seat belt retractor should be locked as quickly as possible to prevent withdrawal of seat belt webbing. By quickly locking the seat belt retractor, the amount of occupant movement within the vehicle is minimized. The desire to quickly lock the seat belt retractor has lead to the development of electrically actuated locking mechanisms for retractors.

U.S. Pat. No. 4,729,525 discloses one such electrically actuated locking mechanism for a retractor. The retractor disclosed in U.S. Pat. No. 4,729,525 is vehicle sensitive and includes a spindle supported for rotation in belt withdrawal and belt retraction directions. An inertia member is rotatable with the spindle. The spindle is also rotatable relative to the inertia member to actuate the locking mechanism. An electromagnet is energizeable upon vehicle deceleration above a predetermined rate to magnetize a core which moves toward the inertia member. When the core engages the inertia member, rotation of the inertia member is slowed, and rotation of the spindle in the belt withdrawal direction relative to the inertia member results. This relative rotation effects actuation of the locking mechanism of the retractor.

U.S. Pat. No. 3,952,966 discloses a seat belt retractor having a ratchet wheel connected to a rotatable spindle. A pawl is supported for pivotal movement toward and away from the ratchet wheel. When the pawl engages a tooth on the ratchet wheel, rotation of the spindle in the belt withdrawal direction is blocked. A spring biases the pawl toward the ratchet wheel. An electromagnet is energizeable to pivot the pawl away from the ratchet wheel.

SUMMARY OF THE INVENTION

The present invention is directed to a seat belt retractor for a vehicle. The retractor comprises a spindle having seat belt webbing wound thereon. The spindle is supported for rotation in belt withdrawal and belt retraction directions. A member is movable between a first position in which the spindle is free to rotate in the belt withdrawal direction and a second position in which the spindle is locked from rotating in the belt withdrawal direction.

A permanent magnet is fixed to the member. An energizeable electromagnet has a core located adjacent the permanent magnet. The permanent magnet is attracted to the core when the electromagnet is de-energized. Upon energization of the electromagnet, the core repels the permanent magnet and, thus, moves the member. The electromagnet is operatively connected with an inertia switch which actuates the electromagnet in response to deceleration or acceleration of the vehicle above a predetermined rate.

In one embodiment of the present invention, a disk is supported for rotation relative to the spindle. Actuatable locking means is provided for locking the spindle from rotation in the belt withdrawal direction. The locking means is actuated in response to rotation of the spindle in the belt withdrawal direction relative to the disk. A plurality of projections extend from the disk. The member is engageable with one of the plurality of projections on the disk to block rotation of the disk in the belt withdrawal direction. This results in rotation of the spindle in the belt withdrawal direction relative to the disk for actuating of the locking means to lock the spindle against rotation in the belt withdrawal direction. The member is located in a position away from the disk when the electromagnet is de-energized and is moved to a position engaging the disk when the electromagnet is energized.

In another embodiment of the present invention, the member is pivotally mounted. A permanent magnet is fixed to a first portion of the member located on one side of the pivot axis of the member and is located adjacent a first portion of a core of an electromagnet. A ferrous member is fixed to a second portion of the member located on a side of the pivot axis of the member opposite the one side and is located adjacent a second portion of the core. The pivot axis is located at the center of gravity of the member. When the electromagnet is energized, the permanent magnet is repelled from the first portion of the core of the electromagnet and the ferrous member is attracted to the second portion of the core to quickly move the member into engagement with the disk.

BRIEF DESCRIPTION OF THE DRAWINGS

Further features of the present invention will become apparent to those skilled in the art to which the present invention relates from reading the following specification with reference to the accompanying drawings, in which:

FIG. 1 is a view of a seat belt retractor including a locking mechanism embodying the present invention;

FIG. 2 is a view of the retractor of FIG. 1, taken approximately along line 2—2 in FIG. 1;

FIG. 5 is an enlarged view of a portion of the retractor of FIG. 2 with parts in different positions;

FIG. 6 is an enlarged view illustrating another embodiment of a locking mechanism according to the present invention; and FIG. 7 is a view similar to FIG. 6 with parts in different positions.

DESCRIPTION OF PREFERRED EMBODIMENTS

Figure 4:
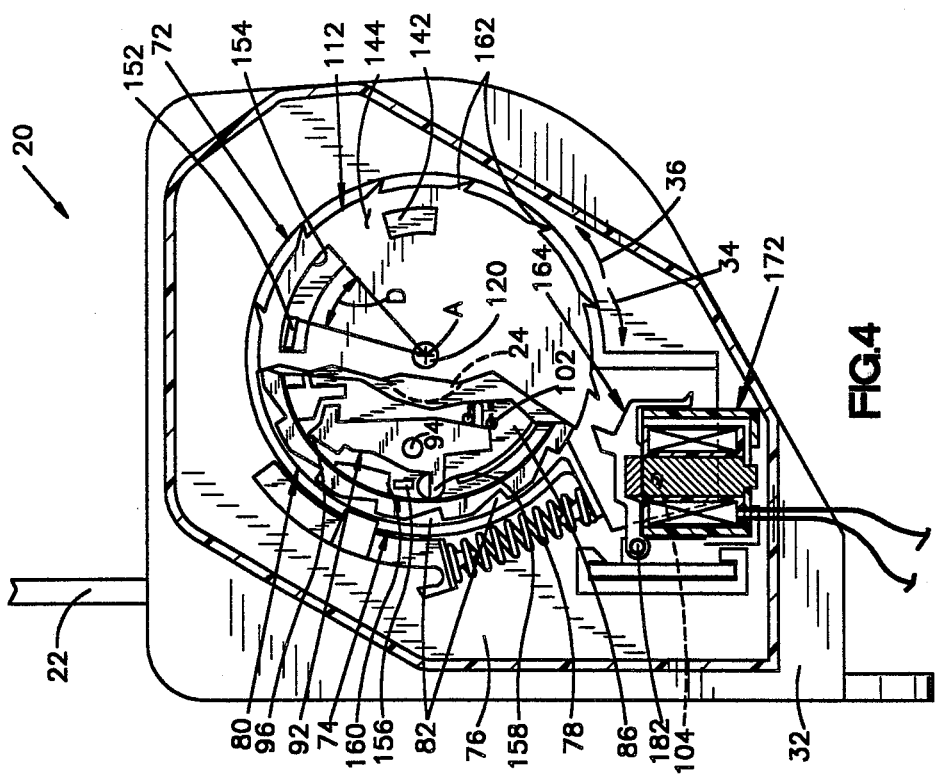
FIG. 4 is a view similar to FIG. 2, with parts broken away.

A vehicle seat belt retractor 20 embodying the present invention is illustrated in FIGS. 1 and 2. Seat belt webbing 22 extends from the retractor 20 for restraining movement of a vehicle occupant, as is known. The belt webbing 22 is connected at one end to a spindle 24 (FIG. 1) of the retractor 20. A frame 32 supports the spindle 24 for rotation about its longitudinal central axis A in a belt withdrawal direction 34 and a belt retraction direction 36. A wind-up spring 38 is connected between the spindle 24 and a spring housing 40 fixed to the frame 32. The wind-up spring 38 biases the spindle 24 to rotate in the belt retraction direction 36 to wind the belt webbing 22 onto the spindle. A fastener (not shown) extends through an opening 42 in the frame 32 to connect the retractor 20 to the vehicle.

Figure 3:
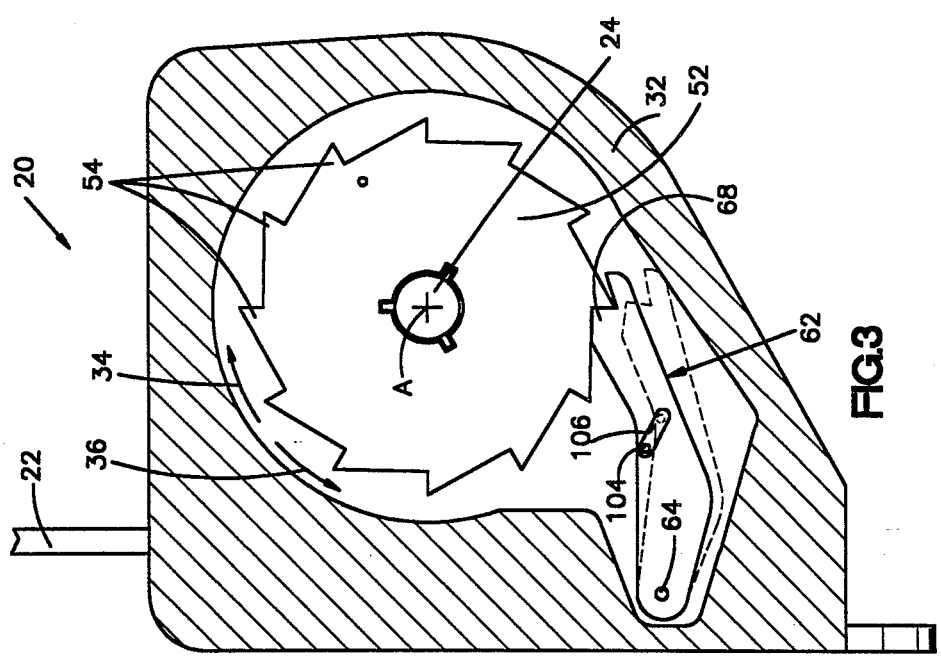
FIG. 3 is a cross sectional view of a portion of the retractor of FIG. 1, taken approximately along line 3—3 in FIG. 1.

A ratchet wheel 52 (FIG. 3) is connected to and rotates with the spindle 24. A plurality of ratchet teeth 54 are equally spaced about the outer periphery of the ratchet wheel 52. A locking pawl 62 is pivotally mounted on a pivot shaft 64 which is supported at axially opposite ends in openings 66 in opposite sides of the frame 32. The pawl 62 is pivotable from a position in which an end portion 68 of the pawl is spaced away from the ratchet wheel 52, as illustrated in dashed lines in FIG. 3, to a position in which the end portion 68 engages one of the plurality of teeth 54 on the ratchet wheel 52, as illustrated in solid lines in FIG. 3. When the end portion 68 of the pawl 62 engages a tooth 54 on the ratchet wheel 52, rotation of the ratchet wheel 52 and the spindle 24 in the belt withdrawal direction 34 is blocked to lock the retractor 20 against the withdrawal of the belt webbing 22.

An actuator 72 (FIGS. 2 and 4) pivots the end portion 68 of the pawl 62 toward the ratchet wheel 52 to engage one of the plurality of teeth 54 in response to the seat belt webbing 22 being withdrawn from the retractor 20 at a rate above a predetermined rate. The actuator 72 also pivots the end portion 68 of the pawl 62 toward the ratchet wheel 52 in response to a relatively small amount of withdrawal of seat belt webbing 22 from the retractor 20 after acceleration or deceleration of the vehicle in any direction at a rate above a predetermined rate.

The actuator 72 includes a base 74 (FIG. 4) supported by a housing 76 which is connected to the frame 32. The base 74 is rotatable about the axis A a slight amount relative to the housing 76. The base 74 is biased to rotate counterclockwise about the axis A, as viewed in FIG. 4, relative to the housing 76 by a spring 78. An axially extending annular ring portion 80 is connected to the base 74. The annular ring portion 80 of the base 74 extends coaxially relative to the spindle 24. A plurality of teeth 82 are equally spaced about the inner periphery of the annular ring portion 80. A drum 86 is located coaxially within the annular ring portion 80 of the base 74. The drum 86 is connected to the spindle 24 for rotation with the spindle and is rotatable relative to the annular ring portion 80 of the base 74.

A pilot pawl 92 is supported for pivotable movement by a pin 94 extending axially from the drum 86. The pilot pawl 92 has an end portion 96 for engaging one of the teeth 82 on the annular ring portion 80 of the base 74. The pilot pawl 92 is biased away from engaging the teeth 82 on the annular ring portion 80 by a spring 102. When the pilot pawl 92 pivots so the end portion 96 of the pilot pawl engages one of the teeth 82 on the annular ring portion 80 of the base 74, the drum 86 and the spindle 24 are coupled to the base. When the spindle 24 and base 74 are coupled together and upon rotation of the spindle 24 in the belt withdrawal direction 34, the base 74 rotates in a clockwise direction about the axis A, as viewed in FIG. 4, relative to the housing 76 against the bias of the spring 78.

A pin 104 (FIGS. 1, 3 and 4) extends axially from the base 74 in a direction axially opposite the direction that the annular ring portion 80 extends from the base. The pin 104 is received in a slot 106 (FIG. 3) in the pawl 62. During rotation of the base 74 in the clockwise direction about the axis A, as viewed in FIG. 4, relative to the housing 76, the pin 104 rotates about the axis A, from the position illustrated in dashed lines in FIG. 3 to the position illustrated in solid lines in FIG. 3. During the clockwise rotation of the pin 104 about the axis A, the pin rides along a surface defining the slot 106 to pivot the pawl 62 about the shaft 64 in a counterclockwise direction, from the position illustrated in dashed lines in FIG. 3, toward the ratchet wheel 52, to the position illustrated in solid lines in FIG. 3.

An inertia member 112 (FIGS. 1 and 4) is supported by a shaft 120 connected to and rotatable with the drum 86. The shaft 120 extends coaxially of the spindle 24. The inertia member 112 includes a circular inertia disk 142 and a circular plastic clutch disk 144. The clutch disk 144 is rotatable relative to the inertia disk 142 through a relatively small arcuate distance D. The relative rotation is limited by a projection 152 on the inertia disk 142 extending axially into an arcuate slot 154 in the clutch disk 144. A spring (not shown), which is connected between the inertia disk and clutch disk 144, biases the inertia disk 142 to rotate in the counterclockwise direction, as viewed in FIG. 4, relative to the clutch disk 144 with a relatively light force. A projection 156 (FIGS. 1 and 4) extending axially from the inertia disk 142 into a space between an arm 158 (FIG. 4) of the pilot pawl 92 and a drive surface 160 of the drum 86.

When the spindle 24 rotates in the belt retraction direction 36, the projection 156 engages the drive surface 160 of the drum 86 to rotate the inertia disk 142 and, thus, the inertia member 112 in the belt retraction direction 36. When the spindle 24 rotates in the belt withdrawal direction 34, the projection 156 engages the arm 158 of the pilot pawl 92 to rotate the inertia member 112 in the belt withdrawal direction 34.

When the seat belt webbing 22 is withdrawn from the retractor 20 at a rate of acceleration above a predetermined rate, rotation of the inertia disk 142 in the belt withdrawal direction 34 lags behind rotation of the spindle 24 in the belt withdrawal direction. When rotation of the inertia member 112 lags behind rotation of the spindle 24 in the belt withdrawal direction 34, the projection 156 forces the pilot pawl 92 to pivot counterclockwise and overcome the bias of the spring 102, as viewed in FIG. 4, so the end portion 96 of the pilot pawl pivots toward the annular ring portion 80 of the base 74. The end portion 96 of the pilot pawl 92 then engages one of the teeth 82 on the annular ring portion 80 of the base 74 to couple the spindle and the base 74 together. Further rotation of the spindle 24 in the belt withdrawal direction 34 rotates the base 74 in the clockwise direction, as viewed in FIG. 4, relative to the housing 76 to pivot the pawl 62 (FIG. 3) toward the ratchet wheel 52.

A plurality of ratchet teeth 162 (FIG. 4) are equally spaced about the outer periphery of the clutch disk 144 of the inertia member 112. A lever arm 164 is pivotable into engagement with one of the teeth 162 to block rotation of the clutch disk 144 and, thus, the inertia member 112. When rotation of the inertia member 112 in the belt withdrawal direction 34 is blocked, any further withdrawal of the belt webbing 22 from the retractor 20 rotates the spindle 24 in the belt withdrawal direction 34 relative to the inertia member 112. This relative rotation causes the projection 156 on the inertia disk 142 to move the end portion 96 of the pilot pawl 92 into engagement with a tooth 82 on the annular ring portion 80 of the base 74. The spindle 24 and base 74 are, thus, coupled together and upon any further rotation of the spindle 24 in the belt withdrawal direction 34, the base rotates causing the pawl 62 to pivot toward the ratchet wheel 52, as described above.

The lever arm 164 is pivoted by an electrically actuatable mechanism 172 (FIG. 4) in response to acceleration or deceleration of the vehicle in any direction above a predetermined rate. An end portion 180 (FIG. 5) of the lever arm 164 is supported for pivotal movement by a pin 182 connected with the housing 76. The lever arm 164 is made of a material which is nonmagnetizeable and is relatively light weight, such as nylon. The lever arm 164 also includes a portion 184 for engaging the clutch disk 144 and one of the ratchet teeth 162 to block rotation of the clutch disk 144 in the belt withdrawal direction 34.

A permanent magnet 202 (FIG. 5) is fixed to the lever arm 164 in a suitable manner, such as by an adhesive bond. The permanent magnet 202 is located intermediate the end portion 180 and the portion 184. The permanent magnet 202 is preferably made of a relatively light material, such as ceramic, to minimize the pivoting mass of the lever arm 164.

The electrically actuatable mechanism 172 includes an electromagnet 192 having wire coils 204 wound about a core 206 which is preferably ferrous. When the electromagnet 192 is de-energized, the permanent magnet 202 is magnetically attracted to the core 206 which holds the lever 164 away from engagement with the clutch disk 144, as illustrated in FIG. 4. The magnetic attraction between the permanent magnet 202 and the core 206 avoids the need for a spring or gravity to move the lever arm 164 to a position disengaged from the clutch disk 144. Further, the retractor may be mounted in various orientations within the vehicle because the lever arm 164 does not have to be acted on by gravity to move it away from the clutch disk 144.

Upon energization of the electromagnet 192, the magnetic polarity at the end of the core 206 adjacent the permanent magnet 202 repels the permanent magnet. When the core 206 repels the permanent magnet 202, the lever arm 164 is pivoted to the position engaging the clutch disk 144, as illustrated in FIG. 5. The electromagnet 192 is actuated by an electrical current conducted through wires 212 connected to the coil 204. The wires 212 are also connected to a known inertia mechanism (not shown) which senses deceleration or acceleration of the vehicle in any direction. When the vehicle decelerates or accelerates above a predetermined rate, such as 0.6 g, an electrical circuit is closed which energizes the electromagnet 192 to repel the permanent magnet 202 and pivot the lever arm 164 to the position illustrated in FIG. 5.

An end portion 186 of the lever arm 164 extends transversely from the lever arm to engage a side of the electromagnet 192. The end portion 186 of the lever arm 164 acts as a shock absorber when the lever arm pivots from the position illustrated in FIG. 5 to the position illustrated in FIG. 4 to reduce noise and wear due to the permanent magnet 202 and core 206 contacting each other.

In the embodiment of the present invention, illustrated in FIGS. 6 and 7, an electrically actuatable mechanism 242 is associated with a lever arm 244. The lever arm 244 is supported for pivotal movement by a pin 246 connected with the housing 76. The pin 246 is located intermediate end portions 252, 254 of the lever arm 244.

The electrically actuatable mechanism 242 includes an electromagnet 284. The electromagnet 284 includes a U-shaped core 282 which is preferably ferrous. A first end portion 280 of the U-shaped core is surrounded by an energizeable coil 286, as described above. A permanent magnet 272 is fixed to the end portion 252 of the lever arm 244. A steel slug 274 is fixed to the end portion 254 of the lever arm 244. The permanent magnet 272 is located adjacent the first end portion 280 of the U-shaped core 282. The steel slug 274 is located adjacent a second end portion 292 of the U-shaped core 282.

When the electromagnet 284 is de-energized, the permanent magnet 272 is attracted to the first end portion 280 of the core 282. The lever arm 244 is forced to pivot to a position in which the end portion 252 of the lever arm is disengaged from the clutch disk 144, as illustrated in FIG. 6. A pad 304 made from a nonmagnetizable material is attached to the first end portion 280 of the core 282 and located between the permanent magnet 272 and the first end portion 280 of the core 282. The pad 304 spaces the permanent magnet 272 away from the first end portion 280 of the core 282. This reduces the magnetic force of attraction between the permanent magnet 272 and the core 282. Thus, a force attempting to move the permanent magnet away from the core 282 can easily overcome this magnetic force of attraction.

When the electromagnet 284 is energized, the first end portion 280 of the core 282 has a magnetic polarity which repels the permanent magnet 272. The second end portion 292 of the core 282 has a magnetic polarity which attracts the steel slug 274. Thus, the lever arm 244 is acted on by magnetic forces acting in opposite directions and on either side of the pivot pin 246. Thus, the end portion 252 of the lever arm 244 is pivoted quickly toward the clutch disk 144, and the end portion 252 engages the clutch disk 144. When the clutch disk 144 rotates in the belt withdrawal direction 34, a tooth 162 on the clutch disk engages the end portion 252 of the lever arm 244, as is illustrated in FIG. 7, and rotation of the clutch disk in the belt withdrawal direction is blocked. This results in the actuator 72 locking the retractor 20 against withdrawal of the belt webbing 22.

The pivot pin 246 is located at the center of gravity of the assembly including the lever arm 244, permanent magnet 272 and steel slug 274. Thus, gravity acting on the mass of this assembly does not have to be overcome to move the assembly. Thus, the assembly can be moved quickly and with a relatively small force.

From the above description of preferred embodiments of the invention, those skilled in the art will perceive improvements, changes and modifications in the present invention. Such improvements, changes and modifications within the skill of the art are intended to be covered by the appended claims.

Having described specific preferred embodiments of the invention, I claim:

1. A seat belt retractor comprising:
    a spindle having seat belt webbing wound thereon, said spindle being supported for rotation in belt withdrawal and belt retraction directions;
    a member movable between a first position in which said spindle is free to rotate in the belt withdrawal direction and a second position in which said spindle is blocked from rotation in the belt withdrawal direction;
    a permanent magnet fixed to said member; and
    an energizable electromagnet including a core located adjacent said permanent magnet for attracting said permanent magnet to thereby move said member to one of its first and second positions when said electromagnet is de-energized and for repelling said permanent magnet to thereby move said member to the other one of its first and second positions upon energization of said electromagnet.

2. The seat belt retractor set forth in claim 1 further including a ratchet wheel connected to said spindle, a plurality of teeth extending from said ratchet wheel, a locking pawl, said locking pawl having a first position spaced from said ratchet wheel and a second position engageable with one of said plurality of teeth on said ratchet wheel to block rotation of said ratchet wheel and said spindle in the belt withdrawal direction, and means for moving said locking pawl to its second position in response to movement of said member to its second position.

3. The seat belt retractor set forth in claim 2 further including means supporting said member for pivotal movement, and said means for moving said locking pawl to its second position includes a clutch disk rotatable relative to said spindle and having a plurality of projections, said member being engageable with one of said plurality of projections on said clutch disk to block rotation of said clutch disk and thereby actuate movement of said locking pawl to its second position.

4. The seat belt retractor set forth in claim 3 wherein said permanent magnet is fixed to said member on one side of the pivot axis of said member and is located adjacent a first end portion of said core, and further including a ferrous member fixed to said member on a second side of the pivot axis of said member opposite said one side and being located adjacent a second end portion of said core, said ferrous member being attracted to said second end portion of said core upon energization of said electromagnet to aid in moving said member to its second position.

5. The seat belt retractor set forth in claim 4 wherein said member is supported for pivotal movement at the center of gravity of said member.

6. A seat belt retractor comprising:
a spindle having seat belt webbing wound thereon, said spindle being supported for rotation in belt withdrawal and belt retraction directions;
a rotatable first member;
means for blocking rotation of said spindle in the belt withdrawal direction in response to rotation of said spindle in the belt withdrawal direction relative to said first member;
a second member movable between a first position in which said second member is disengaged from said first member and a second position in which a portion of said second member engages said first member to restrict rotation of said first member in the belt withdrawal direction and enable rotation of said spindle in the belt withdrawal direction relative to said first member;
a permanent magnet fixed to said second member; and
an energizable electromagnet including a core located adjacent said permanent magnet for attracting said permanent magnet to move said second member to one of its first and second positions when said electromagnet is de-energized and for repelling said permanent magnet to move said second member to the other one of its first and second positions upon energization of said electromagnet.

7. The seat belt retractor set forth in claim 6 further including means supporting said second member for pivotal movement, said permanent magnet being fixed to said second member at a location intermediate said means supporting said second member for pivotal movement and the portion of said second member which engages said first member.

8. The seat belt retractor set forth in claim 7 wherein said permanent magnet is fixed to said second member on one side of the pivot axis of said member and is located adjacent a first end portion of said core, and further including a ferrous member fixed on a second side of the pivot axis of said member opposite said one side and being located adjacent a second end portion of said core, said ferrous member being attracted to said second end portion of said core upon energization of said electromagnet to thereby aid in moving said second member to the other one of its first and second positions.

9. The seat belt retractor set forth in claim 8 wherein said second member is supported for pivotal movement at the center of gravity of said second member.

10. A seat belt retractor comprising:
a spindle having seat belt webbing wound thereon, said spindle being supported for rotation in belt withdrawal and belt retraction directions;
locking means for blocking rotation of said spindle in the belt withdrawal direction;
a disk supported for rotation relative to said spindle for actuating said locking means in response to rotation of said spindle in the belt withdrawal direction relative to said disk;
a member supported for pivotal movement about a pivot axis between a first position in which said member is disengaged from said disk to a second position in which a portion of said member engages said disk to restrict rotation of said disk in the belt withdrawal direction to thereby enable rotation of said spindle in the belt withdrawal direction relative to said disk;
a permanent magnet fixed to an end portion of said member located on one side of the pivot axis of said member;
a ferrous member carried by another end portion of said member located on another side of the pivot axis of said member; and
an energizeable electromagnet including a core having a first end portion located adjacent said permanent magnet to attract said permanent magnet and move said member to its first position when said electromagnet is de-energized and having a second end portion located adjacent said ferrous member so that upon energization of said electromagnet said first end portion of said core repels said permanent magnet and said second end portion of said core attracts said ferrous member to move said member to its second position.

11. The seat belt retractor set forth in claim 10 further including a plurality of projections extending from said disk and wherein said portion of said member which engages said disk engages one of said plurality of projections on said disk to block rotation of said disk in the belt withdrawal direction.

12. The seat belt retractor set forth in claim 10 wherein said member is supported for pivotal movement at the center of gravity of said member.

13. The seat belt retractor set forth in claim 10 further including a pad of nonmagnetizable material located between said permanent magnet and said first end portion of said core to space apart said permanent magnet and said first end portion of said core.

* * * * *